US008588867B2

(12) United States Patent
Lee et al.

(10) Patent No.: US 8,588,867 B2
(45) Date of Patent: Nov. 19, 2013

(54) MOBILE TERMINAL, METHOD OF CONTROLLING WIRELESS CHARGING THEREOF, AND WIRELESS CHARGING SYSTEM THEREOF

(75) Inventors: Jae-cheol Lee, Seoul (KR); Sang-dok Mo, Hwaseong-si (KR); Un-kyu Park, Los Angeles, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 47 days.

(21) Appl. No.: 13/300,901

(22) Filed: Nov. 21, 2011

(65) Prior Publication Data

US 2012/0231856 A1    Sep. 13, 2012

(30) Foreign Application Priority Data

Mar. 8, 2011    (KR) .................. 10-2011-0020618

(51) Int. Cl.
*H02J 7/00*    (2006.01)
*G05D 3/12*    (2006.01)

(52) U.S. Cl.
USPC ............ 455/573; 320/108; 320/109; 700/291

(58) Field of Classification Search
USPC .......... 320/108, 114, 109; 455/573; 700/291, 700/295
See application file for complete search history.

(56) References Cited

U.S. PATENT DOCUMENTS

| 6,374,109 B1* | 4/2002 | Shaheen et al. | 455/434 |
| 2009/0298553 A1* | 12/2009 | Ungari et al. | 455/573 |
| 2011/0115432 A1* | 5/2011 | El-Maleh et al. | 320/108 |

FOREIGN PATENT DOCUMENTS

| JP | 2003-348757 | 12/2003 |
| JP | 2004-023743 | 1/2004 |
| JP | 2004-056555 | 2/2004 |
| KR | 10-2004-0107110 | 12/2004 |
| KR | 10-2005-0058887 | 6/2005 |
| KR | 10-2005-0068931 | 7/2005 |
| KR | 10-2006-0022686 | 3/2006 |
| KR | 10-2007-0013021 A | 1/2007 |
| KR | 10-2007-0033166 | 3/2007 |
| KR | 10-2009-0062224 | 6/2009 |
| KR | 10-2009-0128599 A | 12/2009 |
| KR | 10-2010-0033661 | 3/2010 |
| KR | 10-2010-0101470 | 9/2010 |

* cited by examiner

*Primary Examiner* — Nizar Sivji
(74) *Attorney, Agent, or Firm* — NSIP Law

(57) ABSTRACT

Methods and apparatuses for controlling wireless charging of the mobile terminal are provided. A method of controlling wireless charging of a mobile terminal may include: finding devices in a vicinity of the mobile terminal; if a wireless charging device is not found, comparing a previous charging environment with the found devices to determine whether a current state of the mobile terminal is in an environment where wireless charging can be performed; otherwise, if at least one wireless charging device is found, selecting a wireless charging device having a more optimal connection state from among the wireless charging device found; and outputting a result of the determining or the selecting to a user through the mobile terminal.

25 Claims, 8 Drawing Sheets

| TIMESTAMP | REMAINING AMOUNT OF BATTERY | CHARGING HOUR | BATTERY CHARGING AMOUNT |
|---|---|---|---|
| 2010/09/01 21:32:42 | 30% | 1h 30m | 20% |
| 2010/09/02 22:01:10 | 32% | 1h 50m | 25% |
| ... | ... | ... | ... |

| ID | WiFi INFORMATION (SSID) | Bluetooth ID | Bluetooth Profile |
|---|---|---|---|
| 000001 | MY HOME | 10005951 | Hands-Free |
| 000002 |  | 10006328 | SM5(car) |
| . . . | . . . | . . . |  | ns
MOBILE TERMINAL, METHOD OF CONTROLLING WIRELESS CHARGING THEREOF, AND WIRELESS CHARGING SYSTEM THEREOF

CROSS-REFERENCE TO RELATED APPLICATIONS

This application claims the benefit under 35 U.S.C. §119 (a) of Korean Patent Application No. 10-2011-0020618, filed on Mar. 8, 2011, in the Korean Intellectual Property Office, the entire disclosure of which is incorporated herein by reference for all purposes.

BACKGROUND

1. Field

This disclosure relates to controlling wireless charging of a mobile terminal.

2. Description of the Related Art

Mobile terminals such as, for example, mobile phones and personal digital assistants (PDAs) provide various functions such as a wireless Internet function, an electronic notebook function, a multimedia photographing and reproducing function, a game function, a digital broadcasting function, etc., as well as a basic communication function. Since mobile terminals generally include a battery to allow portability, the battery needs to be periodically charged. The battery is generally charged by a wired charging method using a cable.

SUMMARY

According to an aspect, a method of controlling wireless charging of a mobile terminal may include: finding devices in a vicinity of the mobile terminal; if a wireless charging device is not found, comparing a previous charging environment with the found devices to determine whether a current state of the mobile terminal is in an environment where wireless charging can be performed; otherwise, if at least one wireless charging device is found, selecting a wireless charging device having a more optimal connection state from among the wireless charging device found; and outputting a result of the determining or the selecting to a user through the mobile terminal.

The method may further include: monitoring whether the current state of the mobile terminal is a state in which wireless charging is required, based on previous charge patterns of the mobile terminal, wherein the finding of the devices is performed when the current state of the mobile terminal is the state where wireless charging is required.

The method may further include: analyzing the previous and current charge patterns of the mobile terminal and the charging environment; and storing information about the analyzed charge patterns and the charging environment, wherein the determining and the monitoring are performed based on the stored information.

The charging environment may include: information in which the past wireless-charging environment and the peripheral devices found are mapped to each other.

The outputting may include: outputting information about the previous charging environment if it is determined that the current state of the mobile terminal is in the environment where wireless charging can be performed.

The outputting may further include: outputting profile information of a device connected to the mobile terminal as a result of the determining.

The selecting may include: determining, if a location of the mobile terminal is changed, and selecting a wireless charging device having a more optimal connection state from among at least one wireless charging device found in the changed location.

The selecting may include: selecting a wireless charging device having a more optimal connection state by analyzing the connection state indicating distances between the mobile terminal and the at least one wireless charging device and a strength of power transmitted and received to and from the at least one wireless charging device.

The method may further include: receiving information about a wireless charging device to be used in wireless charging from the user through the mobile terminal after the result of the selecting is output.

The method may further include: determining, if information about the wireless charging device to be used is input by the user, and outputting a location of the wireless charging device, a charging time required for wireless charging, a charging amount, or any combination thereof.

A computer-readable recording medium may have recorded thereon a program for executing the aforementioned method.

According to another aspect, a mobile terminal may include: a finding unit configured to find devices in a vicinity of the mobile terminal; a determination unit configured to compare a previous charging environment with the found devices to determine whether a current state of the mobile terminal is in an environment where wireless charging can be performed; a selection unit configured to select a wireless charging device having a more optimal connection state from among the at least one wireless charging device found; and an output unit configured to output a result of the determining or the selecting to a user.

The mobile terminal may further include a monitoring unit configured to monitor whether the current state of the mobile terminal is a state in which wireless charging is required, based on previous charge patterns of the mobile terminal, wherein the finding unit finds devices in a vicinity of the mobile terminal when the current state of the mobile terminal is determined as a result of monitoring to be the state in which wireless charging is required.

The mobile terminal may further include: an analysis unit configured to analyze the previous and current charge patterns of the mobile terminal and the charging environment; and a storage unit configured to store information about the analyzed charge patterns and charging environment, wherein the determination unit and the monitoring unit are configured to perform the determining and the monitoring based on the stored information.

The charging environment may include information in which the past wireless-charging environment and the peripheral devices found are mapped to each other.

The output unit may be configured to output information about the previous charging environment if it is determined as a result of the determining that the current state of the mobile terminal is in an environment where wireless charging can be performed.

If a location of the mobile terminal is changed, the selection unit may be configured to select a wireless charging device having a more optimal connection state from among at least one wireless charging device found in the changed location.

The selection unit may be configured to select a wireless charging device having a more optimal connection state by analyzing the connection state indicating distances between the mobile terminal and the at least one wireless charging device and a strength of power transmitted and received to and from the at least one wireless charging device.

The mobile terminal may further include an input unit configured to receive information about a wireless charging device to be used in wireless charging from the user through the mobile terminal after the result of the selecting is output.

According to yet another aspect, a wireless charging system may include: a mobile terminal configured to: find one or more peripheral devices by using the near wireless communication function; if a wireless charging device is not directly found, comparing a previous charging environment with the found devices to determine whether a current state of the mobile terminal is in an environment where wireless charging can be performed; otherwise, if at least one wireless charging device is directly found, selecting a wireless charging device having a more optimal connection state from among at least one wireless charging device configured to transmit power for charging in a near wireless communication manner; and outputting a result of the determining or the selecting to a user.

The wireless charging system may further include the at least one wireless charging device configured to transmit power required for charging in a near wireless communication manner.

The wireless charging system may further include the one or more peripheral devices comprising devices having near wireless communication function.

According to a further aspect, a method of controlling wireless charging of a mobile terminal may include: finding devices in a vicinity of the mobile terminal; if a wireless charging device is not found, comparing a previous charging environment with the found devices to determine whether a current state of the mobile terminal is in an environment where wireless charging can be performed; and outputting a result of the determining to a user through the mobile terminal.

Other features and aspects may be apparent from the following detailed description, the drawings, and the claims.

BRIEF DESCRIPTION OF THE DRAWINGS

These and/or other aspects will become apparent and more readily appreciated from the following description of the embodiments, taken in conjunction with the accompanying drawings of which.

Figure 1:
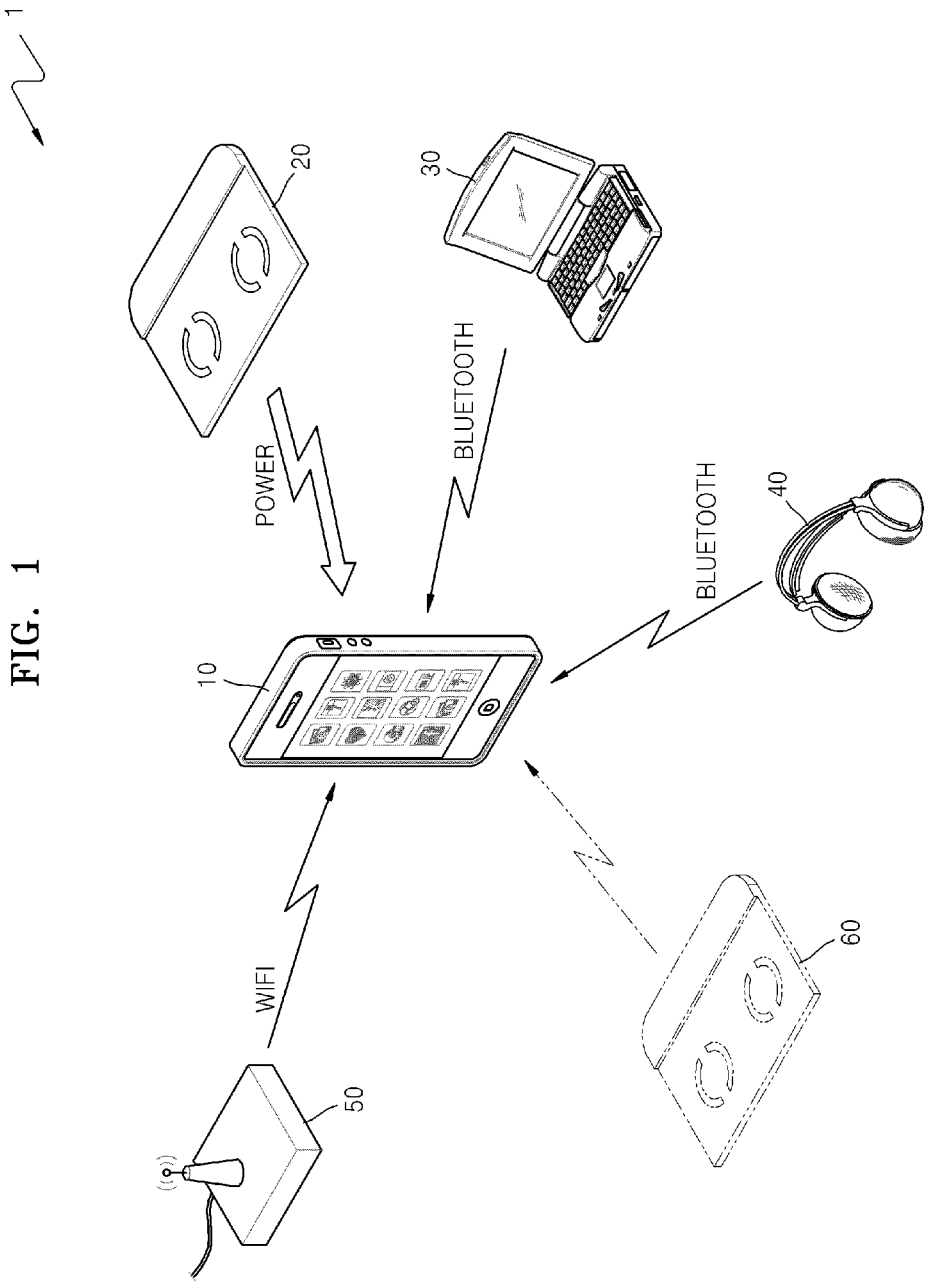
FIG. 1 illustrates a wireless charging system of a mobile terminal.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

FIG. 1 illustrates a wireless charging system 1 of a mobile terminal. As shown, the wireless charging system 1 may include a mobile terminal 10, a wireless charging device 20, a laptop computer 30, headphones 40, a wireless access point (AS) 50, and another wireless charging device 60.

The wireless charging system 1 illustrated in FIG. 1 illustrates elements related to one embodiment. It should be appreciated that in other embodiments the wireless charging system 1 illustrated in FIG. 1 may include different elements. For example, other embodiments may include additional or fewer elements than illustrated in FIG. 1. Also, it should be appreciated that this disclosure is not limited to the particular type of devices discussed herein.

The mobile terminal 10 may include a mobile communication device having a basic wireless communication function, such as, for example, a mobile phone, a personal digital assistant (PDA), notebook, tablet, netbook, or laptop computing device, etc.

Recently health management has become increasingly important. Thus, in some embodiments, the mobile terminal 10 may be configured to monitor a patient's health in 'real-time' in a health care environmental (e.g., at a doctor's office, clinic or hospital). Thus, in order to steadily monitor the patient's health in real time by using the health care system, a power level of a battery of the mobile terminal 10 generally needs to be maintained at a predetermined level.

The power supply of the battery of the mobile terminal 10 may be an important issue. For instance, so-called "smart phones" are widely used these days, but the batteries of the smart phones may be discharged much faster than batteries of ordinary mobile phones due to the frequency of use of various functions of the smart phones, display requirements (such as color and/or backlighting), computing power needed to run application, etc.

For other types of mobile terminals 10, charging may need to be periodically performed on the battery so that a power level of the battery of the mobile terminal 10 is maintained at a predetermined level so as to continuously provide certain functionality of the mobile terminal 10.

Conventionally, a wired cable is generally used to charge mobile terminals. However, use of wired cables is limited due to the length of the cable. Also, it is not easy for a moving user to use the mobile terminal when the mobile terminal is being charged using a wired cable.

The wireless charging device 20 is configured to perform wireless charging. For instance, the wireless charging device 20 may include a conventional wireless power transfer technology. When the mobile terminal 10 is charged using the wireless charging device 20, the user may be freely active with the mobile terminal 10, which the user may find more convenient. Operations and structures of the wireless charging device 20 using the wireless power transfer technology will be appreciated by those having ordinary skill in the art and thus, a more thorough description thereof will not be further provided herein.

The wireless charging device 20 may only be able to perform wireless charging when the mobile terminal 10 is within the transfer range of the wireless charging device 20. As a result, the user may be concerned about whether there is the wireless charging device 20 in the vicinity of the user, and/or the type of the wireless charging device 20, etc. so as to wirelessly charge the mobile terminal 10. Accordingly, the wireless charging system 1 may be configured to control the connection between the mobile terminal 10 and the wireless charging device 20 such that users do not have to be concerned with the location of the wireless charging device 20.

A first embodiment relates to a case where the wireless charging device 20 does not have, or provide, a near wireless communication function such as, for example, WiFi (e.g., IEEE 802.11), Bluetooth, Near Field Communication (NFC), or the like. And a second embodiment relates to a case where the wireless charging device 20 is configured to provide a near wireless communication function. Hereinafter, operations and functions of the wireless charging system 1 according to the first and second embodiments will be described in more detail as follows.

Figures 2, 3A:
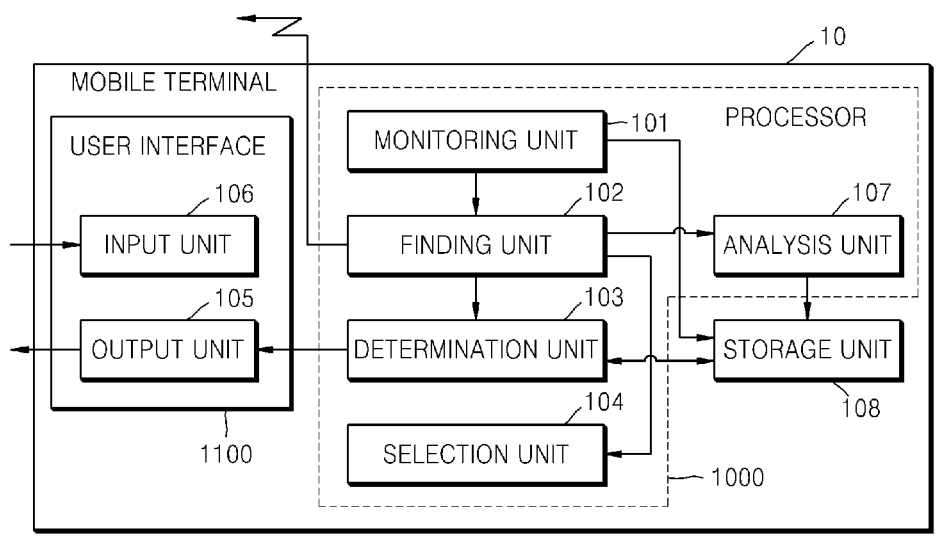
FIG. 2 illustrates a mobile terminal.
FIGS. 3A and 3B illustrate analysis operations of charge patterns.

FIG. 2 illustrates the mobile terminal 10 according to an embodiment. As shown, the mobile terminal 10 may include a processor 1000, a user interface 1100, an analysis unit 107, and a storage unit 108. The processor 1000 may include a monitoring unit 101, a finding unit 102, a determination unit 103, a selection unit 104. The user interface 1100 may include an output unit 105 and an input unit 106.

The processor 1000 may be realized as one integrated body with, or a separate chip, from another processor for performing functions of the mobile terminal 10. For example, the processor 1000 may be include an array of a plurality of logic gates or a combination of memories having stored thereon a program that can be executed by a general microprocessor and the processor 1000. The monitoring unit 101 may be configured to monitor whether wireless charging is required. For instance, in some instances, this may be based on the past charge patterns of the mobile terminal 10.

The battery of the mobile terminal 10 may be monitored by applying a unified criterion. For instance, when the remaining amount of the battery reaches a predetermined level, for example, 10% or 5%, the user may be alerted. However, the user of the mobile terminal 10 has a tendency of charging the battery in different patterns. Thus, in some instances, a monitoring method adaptive to user's charge patterns may be provided. The monitoring unit 101 may use the past charge patterns of the mobile terminal 10, for instance.

The analysis unit 107 may be configured to analyze past and current charge patterns of the mobile terminal 10. The storage unit 108 may be configured to store information about the analyzed charge patterns. And the monitoring unit 101 monitors the current state of the mobile terminal 10 by using information about the charge patterns stored in the storage unit 108.

Charging patterns may be analyzed based on the date/time of the last charging (e.g., timestamp), total charging time, charging interval, the remaining amount of the battery charge, charging amount, and/or the like, for the mobile terminal 10.

Figures 3B, 4:
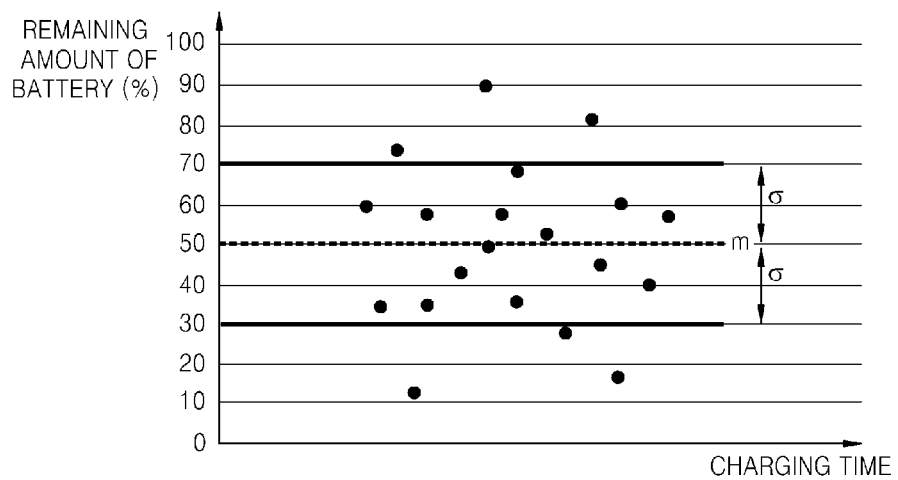
FIG. 4 illustrates a table detailing stored information about charging environments.

FIGS. 3A and 3B illustrate analysis operations of charge patterns. FIG. 3A illustrates a table indicating charge patterns for a mobile terminal. Information about histories where the user charged the mobile terminal 10 may be stored in the table. As shown, charging timestamp, the remaining amount of the battery, charging time, and charging amount are recorded in the table. The analysis unit 107 may analyze the past charge patterns based on the record illustrated in the table of FIG. 3A.

FIG. 3B illustrates a graph indicating charge patterns. The graph is generated based on data from the table of FIG. 3A. In FIG. 3B, the data points indicate remaining amounts of the battery when the user started charging. In one embodiment, the analysis unit 107 may calculate an average m, a standard deviation σ, or both, of the remaining charge of the battery. The result of the calculation may be subsequently stored in the storage unit 108. The operations described above with respect to FIGS. 3A and 3B may be repeatedly performed whenever the user charges the mobile terminal 10. As more charging is performed, the analysis of the user's charge patterns may be more accurate.

Referring back to FIG. 2, the monitoring unit 101 may be configured to monitor the current state of the mobile terminal 10 by using information about the charge patterns stored in the storage unit 108. For example, the monitoring unit 101 monitors the current state of the mobile terminal 10 to determine whether it is a state where wireless charging is required, when the battery of the mobile terminal 10 is within the range of the standard deviation σ based on the average m based on the charge patterns of FIG. 3A described previously.

By using the aforementioned monitoring method, the monitoring unit 10 may provide monitoring adaptive to the user's charge patterns of the mobile terminal 10.

Thus, if it is determined from monitoring the current state of the mobile terminal 10 that wireless charging is required, the output unit 105 may output information indicating that wireless charging is required, to the user. The mobile terminal 10 then may perform operations for performing wireless charging. For instance, the mobile terminal may start by finding peripheral devices.

The finding unit 102 finds peripheral devices of the mobile terminal 10. This may be implemented by using a near wireless communication function according to the second embodiment. For instance, near wireless communication is a method of performing wireless communication by checking relative locations of devices, such as WiFi, Bluetooth, NFC, etc.

Global positioning system (GPS) information and/or base station information may be also used to check the location of the mobile terminal 10. For example, information indicating a state where charging of the mobile terminal 10 has been completed is provided by checking the absolute position of the mobile terminal 10 and the location of a charging device. The GPS information or the base station information may be useful in checking the absolute location of the mobile terminal 10. However, when the mobile terminal 10 is indoors, it may not always be easy to accurately obtain the location of the mobile terminal 10.

In addition, consider a situation in which the mobile terminal 10 is charged by a charging device installed in a moving car. While the user moves toward the car, the mobile terminal 10 and the charging device are also moved. Thus, even though the mobile terminal 10 may continuously check its absolute location by using the GPS information, etc., if the charging device installed in the car does not check the GPS information, etc., then the mobile terminal 10 may not be able to readily find the charging device.

Thus, the mobile terminal 10 may be configured to also check the relative locations of devices. For instance, the mobile terminal 10 may use a near wireless communication function to do so. Moreover, even when the user is indoors or moving, etc., the charging device may be efficiently and optimally found at any time.

Operation of the mobile terminal 10 according to the first embodiment will now be described.

As described above, the first embodiment may be used with a wireless charging device 20 which is not configured to perform the near wireless communication function. In the first embodiment, the finding unit 102 may not directly find the wireless charging device 20. Thus, the user cannot determine whether the wireless charging device 20 exists in the vicinity of where the user is standing. Furthermore, it may be difficult to determine whether wireless charging can be performed. Thus, the mobile terminal 10 according to the first embodiment may be configured to determine whether the current state of the mobile terminal 10 is similar to a previous ambient situation where the mobile terminal 10 was charged and informs the user whether wireless charging can be performed.

For example, when the wireless charging device 20 is not found, the determination unit 103 may compare a previous charging environment with found peripheral devices to determine whether wireless charging can be performed.

The wireless charging system 1 of FIG. 1 may be a previous environment where the user had previously performed wireless charging.

The wireless charging device 20 according to the first embodiment may not have near wireless communication functionality in all instances. However, the mobile terminal 10 may still be able to determine that the wireless charging device 20 exists due to the existence of the peripheral devices such as the laptop 30, the Bluetooth headphones 40 and the wireless AP 50. For instance, assuming that the environment of the wireless charging system 1 of FIG. 1 is a user's room, the mobile terminal 10 may determine that the wireless charging device 20 exists in the user's room if other peripheral devices are found. Also, the mobile terminal 10 may determine whether wireless charging can be performed using the peripheral devices by using the method in another environment.

The analysis unit 107 analyzes the previous and current charging environments of the mobile terminal 10. The storage unit 108 stores information about the analyzed charging environment, i.e., information about the peripheral devices. The information about the charging environment may include information about the wireless charging device 20 that performed wireless charging and the peripheral devices found that is mapped to each other. Subsequently, the determination unit 103 may determine whether wireless charging can be performed by using the mapped information about the charging environment stored in the storage unit 108.

FIG. 4 illustrates a table related to stored information about charging environments. As shown in the table, information about each charging environment is indicated by each identification number (ID). When the wireless charging device 20 exists in an environment corresponding to an ID, the environment and information about the peripheral devices found may be mapped to each other. The table may be electrically stored in a memory, for instance.

For example, in a wireless charging environment having an ID of 00001, a WiFi device having a service set identifier (SSID) of "MY HOME" and devices having a Bluetooth ID of 10005951 are mapped as the peripheral devices found by using the near wireless communication function. Information about "Hands-Free" operational mode that is contained in a Bluetooth profile may also be additionally mapped to the mapped information. In another example, in a wireless charging environment having an ID of 00002, a device having a Bluetooth ID of 10006328 is mapped as the peripheral devices found by using the near wireless communication function, and it is mapped that the Bluetooth Profile is an SM5 car.

The finding unit 102, according to the first embodiment, finds devices in the vicinity of the mobile terminal 10. When no the wireless charging device 20 is directly found, the determination unit 103 may determine whether wireless charging can be performed, by comparing the table of FIG. 4 indicating the past charging environment and the found peripheral devices. Thus, the finding unit 102 may find a Bluetooth device having a Bluetooth ID of 10006328 and a Bluetooth Profile of an SM5 car. And the determination unit 103 may determine that a wireless charging device is provided in the SM5 car according to the table of FIG. 4. Wireless charging can then be performed.

Referring back to FIG. 2, the output unit 105 outputs a result of the determination by the determination unit 103 to the user through the mobile terminal 10. The result of the determination may be output to a display device such as, for example, a liquid crystal display (LCD) screen of the mobile terminal 10 and/or may be output as voice and/or other sound through a speaker of the mobile terminal 10.

As the result of the determination by the determination unit 103, the output unit 105 outputs information about previous charging environments to the user. For example, the output unit 105 may output information about a previous charging environment corresponding to the ID illustrated in FIG. 4. Also, the output unit 105 may output profile information of a device connected in the near wireless communication manner, for example, a Bluetooth Profile.

The user may recognize that the current mobile terminal 10 is in an area where wireless charging can be performed, from the output result of the output unit 105.

Figure 5:
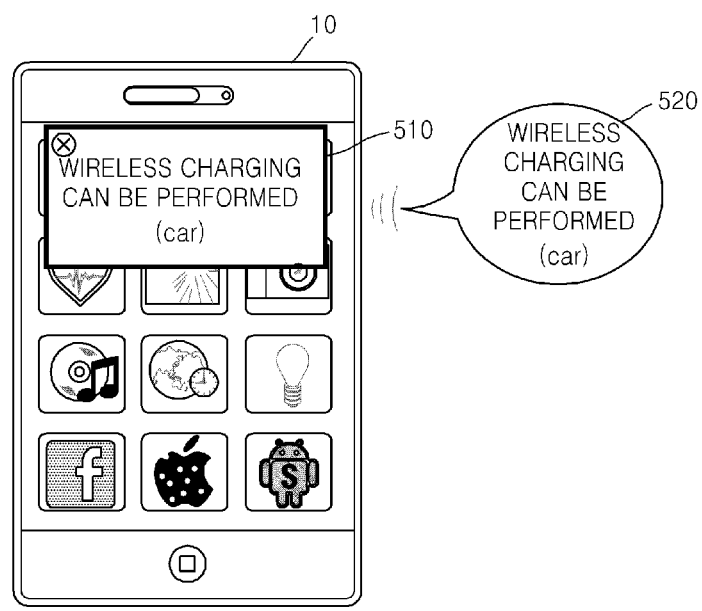
FIG. 5 illustrates a situation where the result of determination of a determination unit is output to a mobile terminal.

FIG. 5 illustrates a situation where the result of the determination by the determination unit 103 is output to the mobile terminal 10. The mobile terminal 10 outputs to the user that the current state of the mobile terminal 10 is in an area where wireless charging can be performed and also outputs information about the previous charging environment, by using a displaying 510 on a screen, sounding an alarm 520 (e.g., through a speaker), or both, as a result of the determination.

Next, the operation of the mobile terminal 10 according to the second embodiment will be described. As described previously, the second embodiment may relate to a situation in which the wireless charging device 20 has the near wireless communication function. In the second embodiment, the finding unit 102 can directly find the wireless charging device 20. However, as in the wireless charging system 1 of FIG. 1, when another wireless charging device 60 (other than the wireless charging device 20 exists), the user may not know whether wireless charging can be optimally performed by using either of the wireless charging devices 20 and 60. This may be the case, in particular, when the user moves around in an environment where both wireless charging devices 20 and 60 (and/or other charging devices) may exist. Thus, the mobile terminal 10 may be further configured to control connection between the mobile terminal 10 and the wireless charging device 20 or 60 (and/or other charging devices) so that wireless charging can be optimally performed.

As in the first embodiment described above, the finding unit 102 according to the second embodiment finds devices in the vicinity of the mobile terminal 10, for example, by using the near wireless communication function. However, according to the second embodiment, unlike in the first embodiment, as a result of finding by using the finding unit 102, both the wireless charging devices 20 and 60 of FIG. 1 may be found.

When at least one of the wireless charging devices 20 and 60 is directly found, the selection unit 104 may select, for example, the wireless charging device 20 having the more optimal or better connection state from among the wireless charging devices 20 and 60.

The selection unit 104 is configured to select the wireless charging device 20 having the better connection state by analyzing a connection state indicating a distance between the mobile terminal 10 and each of the wireless charging devices 20 and 60 and a strength of power transmitted and received to and from each of the wireless charging devices 20 and 60. For example, the selection unit 104 selects the wireless charging device 20 that has the more optimal connection state by comparing connections states of the wireless charging devices 20 and 60 after the wireless charging devices 20 and 60 are found.

Furthermore, when the location of the mobile terminal 10 is changed, the selection unit 104 may select the wireless charging device 20 having the more optimal connection state from among the wireless charging devices 20 and 60 found in the changed location.

Referring again to FIG. 1, in the second embodiment, both wireless charging devices 20 and 60 exist. However, if only one wireless charging device 20 exists, the selection unit 104 may simply select the wireless charging device 20.

Figure 6:
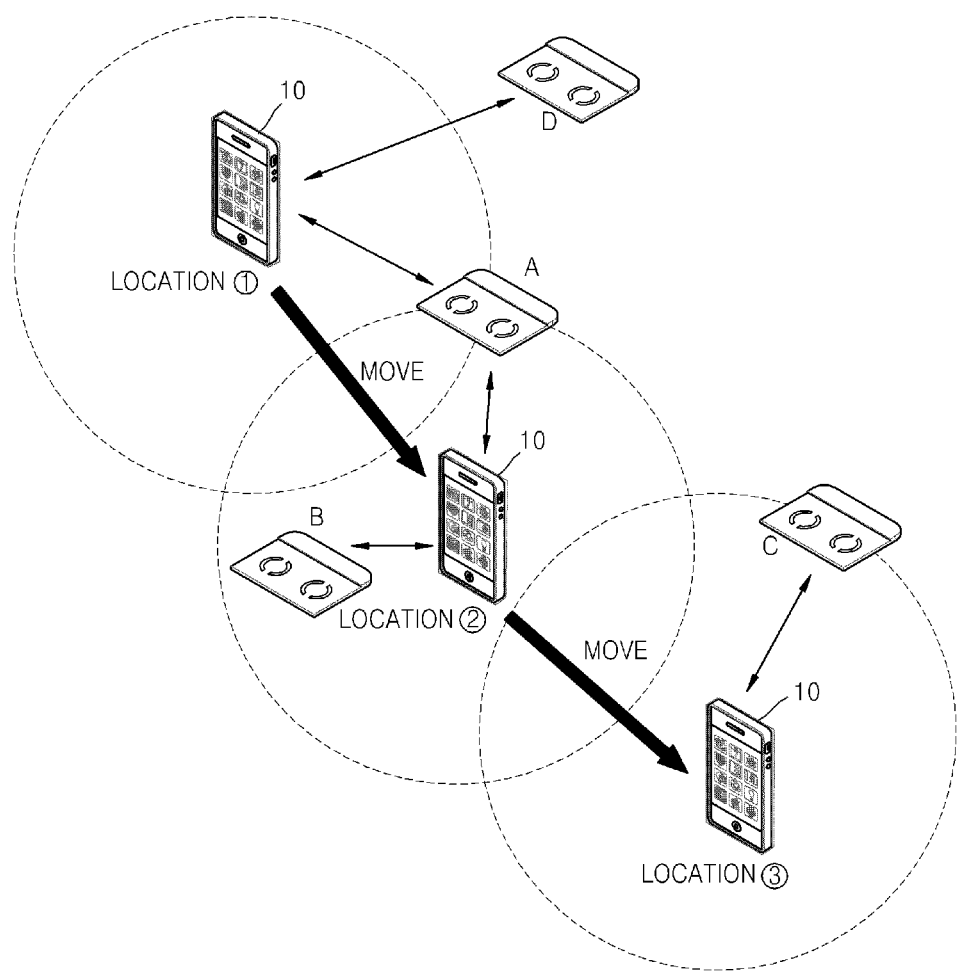
FIG. 6 illustrates a wireless charging method in a situation where a mobile terminal is located in an environment in which a plurality of wireless charging systems exist.

FIG. 6 illustrates a wireless charging method in a situation where a mobile terminal is located in an environment in which a plurality of wireless charging systems exists. In FIG. 6, the mobile terminal 10 is moved from a location ① to a location ③ via location ②.

When the mobile terminal 10 is disposed in the location ①, a wireless charging device A and a wireless charging device D are found by the finding unit 102. Since the wireless charging device A and the wireless charging device B are directly found, the selection unit 104 selects one of the wireless charging devices A and B having the more optimal or better connection state. When the distance between the mobile terminal 10 and the wireless charging device B is shorter than a distance between the mobile terminal 10 and the wireless charging device A and the power transmitted and received to and from the wireless charging device B is stronger than power transmitted and received to and from the wireless charging device A, the connection state of the wireless charging device B may be more optimal than that of the wireless charging device A. Thus, the selection unit 104 selects the wireless charging device B.

When the mobile terminal 10 is disposed in the location ③, a wireless charging device C is found by the finding unit 102. Since only the wireless charging device C is directly found, the selection unit 104 selects the wireless charging device C.

Even when the location of the mobile terminal 10 is changed, the selection unit 104 may select the wireless charging device having the more optimal connection state in the changed location. For example, the mobile terminal 10 may change the wireless charging device and may perform wireless charging without any limitation in terms of the location of the mobile terminal 10.

Referring back to FIG. 2, the output unit 105 outputs a result of selection by the selection unit 104 to the user through the mobile terminal 10. Furthermore, the output unit 105 may additionally output information about distances between the mobile terminal 10 and the wireless charging devices 20 and 60 in the vicinity of the mobile terminal 10 and directions thereof. The outputting method is as described above.

Figure 7:
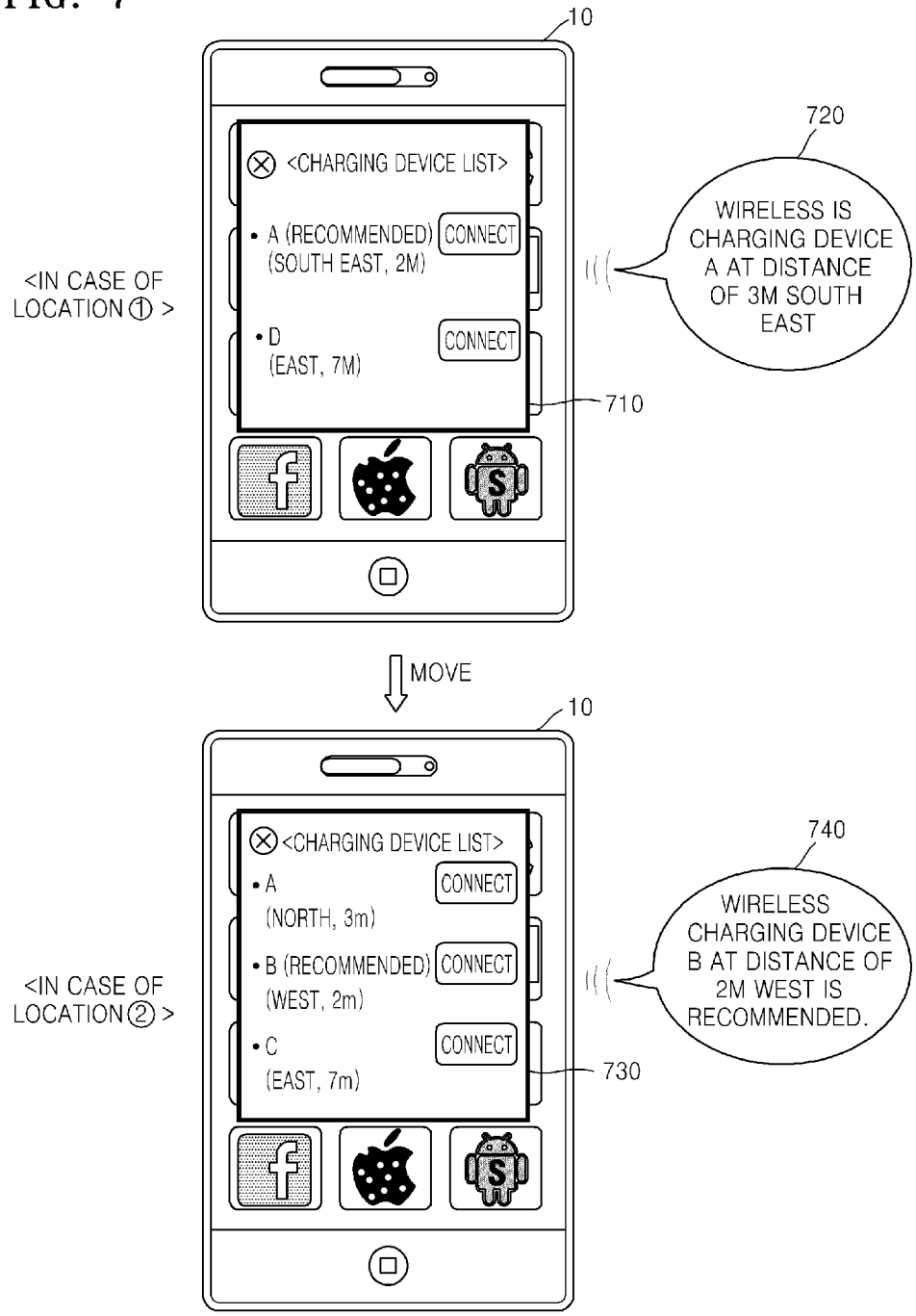
FIG. 7 illustrates a situation where a result of selecting found wireless charging devices is output to a mobile terminal.

FIG. 7 illustrates a situation where the result of selecting found wireless charging devices is output to a mobile terminal. When the mobile terminal 10 is disposed in the location ①, the mobile terminal 10 outputs information about the wireless charging devices found by displaying a message 710 on a screen, sounding an alarm 720 through a speaker, or both, information about the wireless charging device selected from among them, and information about distances between the mobile terminal 10 and the wireless charging devices and directions thereof. The selected wireless charging device may correspond to the wireless charging device recommended by the mobile terminal 10. In addition, when the mobile terminal 10 is disposed in the location ②, the mobile terminal 10 may output the information by displaying a message 730 on a screen, sounding an alarm 740 (e.g., through a speaker), or both.

The user may recognize the wireless charging devices 20 and 60 in the vicinity of the mobile terminal 10 and the wireless charging device 20 or 60 having the more optimal connection state as a result of the information output by the output unit 105.

The input unit 106 receives information about the wireless charging device 20 to be used in wireless charging, from the user after the result of the selection is output. For example, the user inputs information about the wireless charging device 20 to be used in wireless charging by referring to the result of the outputting by the output unit 105. As such, the mobile terminal 10 is connected to the wireless charging device 20, and wireless charging starts to be performed.

When information about the wireless charging device 20 to be used is input by the user, the output unit 105 may further output the location of the wireless charging device 20, a charging time required for wireless charging, a charging amount, or a combination thereof.

Figure 8:
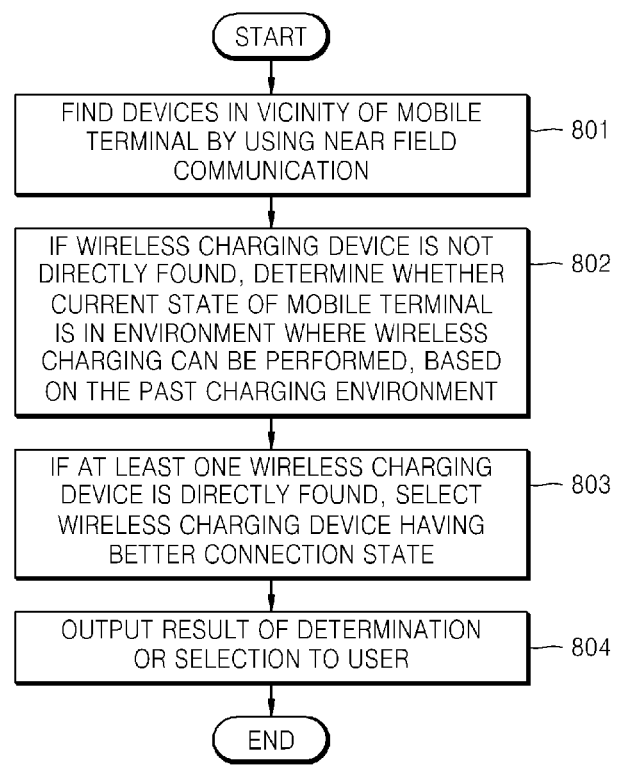
FIG. 8 is a flowchart illustrating a method of controlling wireless charging of a mobile terminal.

FIG. 8 is a flowchart illustrating a method of controlling wireless charging of a mobile terminal. In some embodiments, the method of controlling wireless charging of the mobile terminal may be implemented by the mobile terminal 20 of FIG. 2. This may be implemented in a time series, for instance.

In operation 801, the finding unit 102 finds devices in the vicinity of the mobile terminal 20 by using the near wireless communication function.

In operation 802, when the wireless charging device is not directly found, the determination unit 103 determines whether the current state of the mobile terminal 10 is in an environment where wireless charging may be performed, by comparing a previous charging environment and the found peripheral devices.

In operation 803, the selection unit 104 selects a wireless charging device having the better connection state from among at least one wireless charging device when at least one wireless charging device is directly found.

In operation 804, the output unit 105 outputs a result of determination and/or selection to the user.

Figure 9:
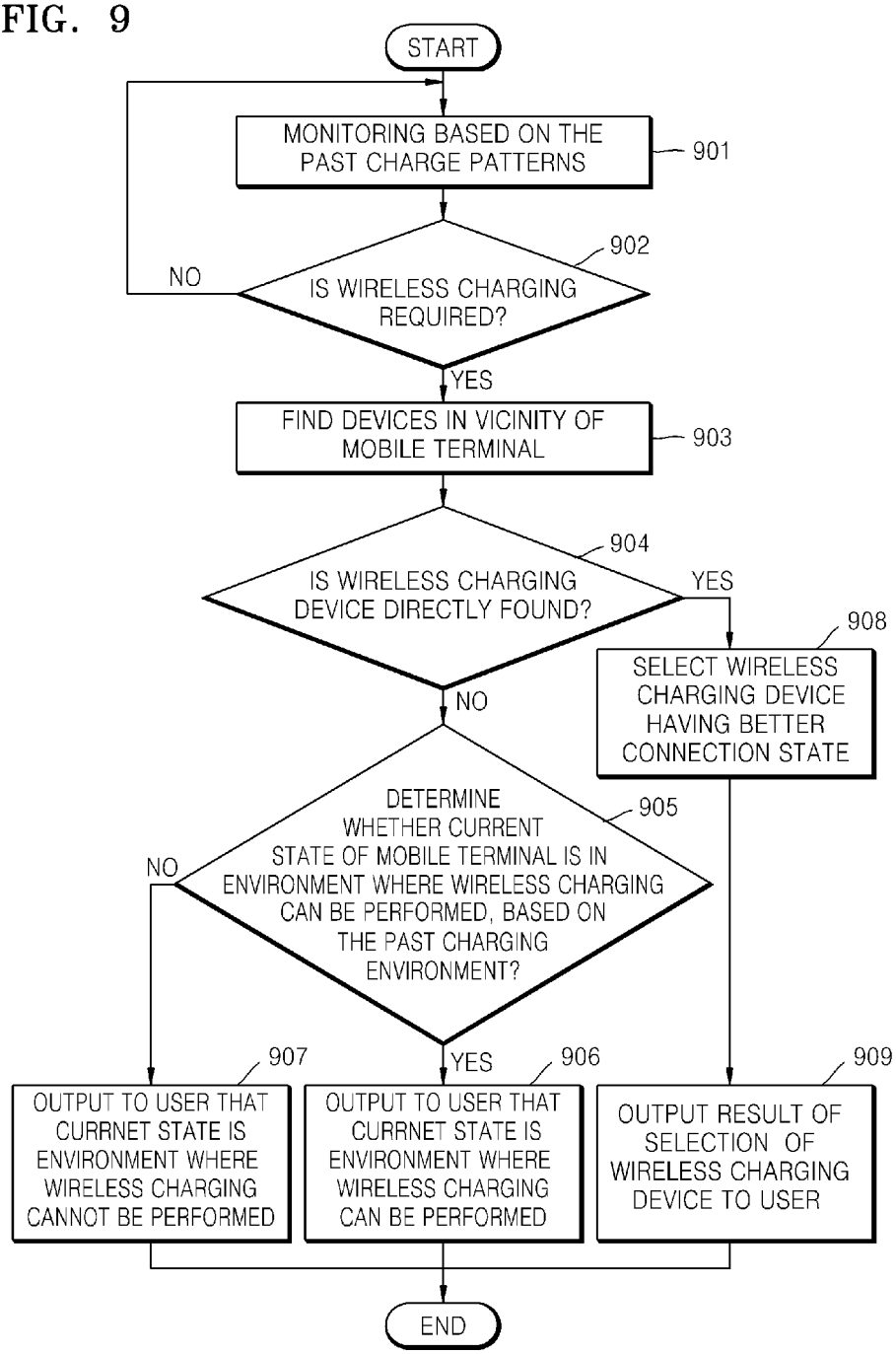
FIG. 9 is a flowchart of one method of controlling wireless charging of a mobile terminal illustrated in FIG. 8.

FIG. 9 is a flowchart of the method of controlling wireless charging of a mobile terminal illustrated in FIG. 8.

In operation 901, the monitoring unit 101 monitors whether the current state of the mobile terminal 10 is a state where wireless charging is required, based on previous charge patterns of the mobile terminal 10.

In operation 902, as a result of the monitoring by the monitoring unit 101, if it is determined that the current state of the mobile terminal 10 is the state where wireless charging is required, the method proceeds to operation 903. If not, the method returns to operation 901.

In operation 903, the finding unit 102 finds devices in the vicinity of the mobile terminal 10 by using the near wireless communication function.

In operation 904, as a result of finding by using the finding unit 102, if the wireless charging device is not directly found, the method proceeds to operation 905. Otherwise, if the wireless charging device is directly found, the method proceeds to operation 908.

In operation 905, the determination unit 103 determines whether the current state of the mobile terminal 10 is in an environment where wireless charging can be performed by comparing the previous charging environment with the found peripheral devices. As a result of the determination by the determination unit 103, if the current state of the mobile terminal 10 is an environment where wireless charging can be performed, the method proceeds to operation 906. If not, the method proceeds to operation 907.

In operation 906, the output unit 105 outputs to the user information indicating that the current state of the mobile terminal 10 is in an environment where wireless charging can be performed.

In operation 907, the output unit 105 outputs to the user information indicating that the current state of the mobile terminal 10 is in an environment where wireless charging cannot be performed.

In operation 908, the selection unit 104 selects a wireless charging device having a more optimal or better connection state from among the wireless charging device found.

In operation 909, the output unit 105 outputs a result of the selecting of the wireless charging device to the user.

As described above, monitoring that is adaptive to a user may be provided at the time when a battery of a mobile terminal needs to be charged. Also, even when a wireless charging device does not have a near wireless communication function and cannot be found, it may be easily checked whether a current environment of the wireless charging device is an environment in which wireless charging can be performed from among a plurality of individual environments, an optimal wireless charging device can be automatically found and the user can be informed about it so that the user can perform wireless charging continuously by using the optimal wireless charging device without any limitation in terms of movement.

The units described herein may be implemented using hardware components and/or software components in various embodiments. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

A terminal (which may a mobile terminal) may be an electronic or electromechanical hardware device that is used for entering data into, and displaying data from, a host computer or a host computing system. The function of a terminal can be confined to display and input of data; though a terminal with significant local programmable data processing capability may be called a "smart terminal" or fat client. A personal computer can run software that emulates the function of a terminal, sometimes allowing concurrent use of local programs and access to a distant terminal host system.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of controlling wireless charging of a mobile terminal, the method comprising:
    finding devices in a vicinity of the mobile terminal;
    if at least one wireless charging device is not found by the mobile terminal, among the found devices, comparing, by the mobile terminal, devices of a previous charging environment where the wireless charging of the mobile terminal can be performed, with the found devices to determine whether the mobile terminal is in the previous charging environment, the at least one wireless charging device configured to perform the wireless charging of the mobile terminal;
    if the at least one wireless charging device is found among the found devices, selecting a wireless charging device comprising a more optimal connection state from among the at least one wireless charging device, the more optimal connection state comprising a higher strength of power transmitted and received to and from the wireless charging device; and
    outputting a result of the determining or the selecting to a user through the mobile terminal.

2. The method of claim 1, further comprising:
    monitoring whether the mobile terminal requires the wireless charging based on previous charge patterns of the mobile terminal,
    wherein the finding of the devices is performed when the mobile terminal requires the wireless charging.

3. The method of claim 2, further comprising:
    analyzing the previous charge patterns and current charge patterns of the mobile terminal and the previous charging environment; and
    storing information about the analyzed charge patterns and previous charging environment,
    wherein the determining and the monitoring are performed based on the stored information.

4. The method of claim 1, wherein the previous charging environment comprises information in which a past wireless-charging environment and peripheral devices previously-found, of the mobile terminal, are mapped to each other.

5. The method of claim 1, further comprising:
    outputting information about the previous charging environment if the mobile terminal is in the previous charging environment.

6. The method of claim 5, further comprising:
    outputting profile information of a device connected to the mobile terminal if the mobile terminal is in the previous charging environment.

7. The method of claim 1, further comprising:
    determining if a location of the mobile terminal is changed; and
    selecting a wireless charging device comprising a more optimal connection state from among at least one wireless charging device found in the changed location.

8. The method of claim 1, further comprising:
    selecting the wireless charging device comprising the more optimal connection state from among the at least one wireless charging device based on connection states indicating respective distances between the mobile terminal and the respective at least one wireless charging device, and respective strengths of power transmitted and received to and from the respective at least one wireless charging device.

9. The method of claim 1, further comprising:
    receiving information about a wireless charging device to be used in the wireless charging from the user through the mobile terminal after the result of the selecting is output.

10. The method of claim 9, further comprising:
    outputting a location of the wireless charging device, or a charging time required for the wireless charging, or a charging amount, or any combination thereof.

11. A non-transitory computer-readable storage medium storing a program comprising instructions to cause a computer to perform the method of claim 1.

12. A mobile terminal comprising:
    a finding unit configured to find devices in a vicinity of the mobile terminal;
    a determination unit configured to compare devices of a previous charging environment where wireless charging of the mobile terminal can be performed, with the found devices to determine whether the mobile terminal is in the previous charging environment, if at least one wireless charging device is not found among the found devices, the at least one wireless charging device configured to perform the wireless charging of the mobile terminal;
    a selection unit configured to select a wireless charging device comprising a more optimal connection state from among the at least one wireless charging device, if the at least one wireless charging device is found among the found devices, the more optimal connection state comprising a higher strength of power transmitted and received to and from the wireless charging device; and
    an output unit configured to output a result of the determining or the selecting to a user through the mobile terminal,
    wherein the finding unit, or the determination unit, or the selection unit, or the output unit, or any combination thereof is implemented by a processor.

13. The mobile terminal of claim 12, further comprising:
    a monitoring unit configured to monitor whether the mobile terminal requires the wireless charging based on previous charge patterns of the mobile terminal,
    wherein the finding unit is further configured to perform the finding when the mobile terminal requires the wireless charging.

14. The mobile terminal of claim 13, further comprising:
    an analysis unit configured to analyze the previous charge patterns and current charge patterns of the mobile terminal and the previous charging environment; and
    a storage unit configured to store information about the analyzed charge patterns and previous charging environment,
    wherein the determination unit and the monitoring unit are further configured to perform the determining and the monitoring based on the stored information.

15. The mobile terminal of claim 12, wherein the previous charging environment comprises information in which a past wireless-charging environment and peripheral devices previously-found, of the mobile terminal, are mapped to each other.

16. The mobile terminal of claim 12, wherein the output unit is further configured to:
    output information about the previous charging environment if the mobile terminal is in the previous charging environment.

17. The mobile terminal of claim 12, wherein, if a location of the mobile terminal is changed, the selection unit is further configured to:

select a wireless charging device comprising a more optimal connection state from among at least one wireless charging device found in the changed location.

18. The mobile terminal of claim 12, wherein the selection unit is further configured to:
select the wireless charging device comprising the more optimal connection state from among the at least one wireless charging device based on connection states indicating respective distances between the mobile terminal and the respective at least one wireless charging device, and respective strengths of power transmitted and received to and from the respective at least one wireless charging device.

19. The mobile terminal of claim 12, further comprising:
an input unit configured to receive information about a wireless charging device to be used in the wireless charging from the user through the mobile terminal after the result of the selecting is output.

20. A wireless charging system comprising:
a mobile terminal configured to:
find one or more peripheral devices by using a near wireless communication function,
if at least one wireless charging device is not directly found among the one or more peripheral devices, compare devices of a previous charging environment where wireless charging of the mobile terminal can be performed, with the one or more peripheral devices to determine whether the mobile terminal is in the previous charging environment, the at least one wireless charging device configured to perform the wireless charging of the mobile terminal in a near wireless communication manner,
if the at least one wireless charging device is directly found among the one or more peripheral devices, select a wireless charging device comprising a more optimal connection state from among the at least one wireless charging device, the more optimal connection state comprising a higher strength of power transmitted and received to and from the wireless charging device, and
output a result of the determining or the selecting to a user through the mobile terminal.

21. The wireless charging system of claim 20, further comprising:
the at least one wireless charging device configured to perform the wireless charging of the mobile terminal in the near wireless communication manner.

22. The wireless charging system of claim 20, further comprising:
the one or more peripheral devices comprising the near wireless communication function.

23. The wireless charging system of claim 20, wherein the mobile terminal is further configured to:
analyze previous charge patterns and current charge patterns of the mobile terminal and the previous charging environment;
store information about the analyzed charge patterns and previous charging environment; and
monitor whether the mobile terminal requires the wireless charging based on the stored information,
wherein the determining is performed based on the stored information.

24. A method of controlling wireless charging of a mobile terminal, the method comprising:
finding one or more peripheral devices by using a near wireless communication function;
if at least one wireless charging device is not directly found by the mobile terminal, among the one or more peripheral devices, comparing, by the mobile terminal, devices of a previous charging environment where wireless charging of the mobile terminal can be performed, with the one or more peripheral devices to determine whether the mobile terminal is in the previous charging environment, the at least one wireless charging device configured to perform the wireless charging of the mobile terminal in a near wireless communication manner;
if the at least one wireless charging device is directly found among the one or more peripheral devices, selecting a wireless charging device comprising a more optimal connection state from among the at least one wireless charging device, the more optimal connection state comprising a higher strength power transmitted and received to and from the wireless charging device; and
outputting a result of the determining or the selecting to a user through the mobile terminal.

25. The method of claim 24, further comprising:
analyzing previous charge patterns and current charge patterns of the mobile terminal and the previous charging environment;
storing information about the analyzed charge patterns and previous charging environment; and
monitoring whether the mobile terminal requires the wireless charging based on the stored information,
wherein the determining is performed based on the stored information.

* * * * *